US009579928B2

(12) United States Patent
Granieri et al.

(10) Patent No.: US 9,579,928 B2
(45) Date of Patent: Feb. 28, 2017

(54) RIM FOR A BICYCLE WHEEL AND RESPECTIVE BICYCLE WHEEL, AS WELL AS METHOD FOR MANUFACTURING SAID RIM

(71) Applicant: Campagnolo S.r.l., Vicenza (IT)

(72) Inventors: Amleto Granieri, Vicenza (IT); Ruggero Grotto, Dueville (IT)

(73) Assignee: Campagnolo S.r.l., Vicenza (IT)

( * ) Notice: Subject to any disclaimer, the term of this patent is extended or adjusted under 35 U.S.C. 154(b) by 37 days.

(21) Appl. No.: 14/692,268

(22) Filed: Apr. 21, 2015

(65) Prior Publication Data

US 2015/0306907 A1    Oct. 29, 2015

(30) Foreign Application Priority Data

Apr. 23, 2014  (IT) ............................ MI2014A0763

(51) Int. Cl.
  *B60B 21/08*    (2006.01)
  *B60B 21/10*    (2006.01)
  *B60B 1/00*     (2006.01)

(52) U.S. Cl.
  CPC ............ B60B 21/08 (2013.01); B60B 21/104 (2013.01); *B60B 1/003* (2013.01); *B60B 2310/228* (2013.01); *B60B 2310/231* (2013.01); *B60B 2310/232* (2013.01); *B60B 2310/621* (2013.01); *B60Y 2200/13* (2013.01)

(58) Field of Classification Search
  CPC . B60B 21/08; B60B 21/104; B60B 2310/228; B60B 2310/231; B60B 2310/232; B60B 2310/621

USPC ....................................................... 188/24.13
See application file for complete search history.

(56) References Cited

U.S. PATENT DOCUMENTS

| 3,433,327 | A | * | 3/1969 | Regis | B60B 21/08 188/218 XL |
| 3,732,951 | A | * | 5/1973 | Hata | B62L 1/10 188/24.13 |
| 5,056,630 | A | * | 10/1991 | Fujii | B60B 21/08 188/218 XL |
| 6,065,812 | A | * | 5/2000 | Lee | B60B 21/062 188/24.13 |
| 6,120,105 | A | * | 9/2000 | Chern | B60B 21/025 301/95.104 |
| 6,273,518 | B1 | * | 8/2001 | Chen | B60B 21/08 301/95.101 |
| 2004/0090110 | A1 | * | 5/2004 | Bernardi | B60B 21/08 301/95.101 |

(Continued)

FOREIGN PATENT DOCUMENTS

| DE | 29520629 U1 * | 2/1996 | ............. B60B 21/08 |
| DE | 20012054 U1 | 10/2000 | |

(Continued)

OTHER PUBLICATIONS

Italian Search Report and Written Opinion in Italian Application No. IT MI2014A000763, Dec. 12, 2014 with English translation.

*Primary Examiner* — Kip T Kotter
(74) *Attorney, Agent, or Firm* — Volpe and Koenig, P.C.

(57) ABSTRACT

The invention relates to a rim for a bicycle wheel comprising an annular body with sidewalls wherein at least one sidewall includes a brake track configured to cooperate with a bicycle brake pad. The brake track includes a groove that extends along a helically shaped path.

16 Claims, 4 Drawing Sheets

(56) References Cited

U.S. PATENT DOCUMENTS

Figure 1:
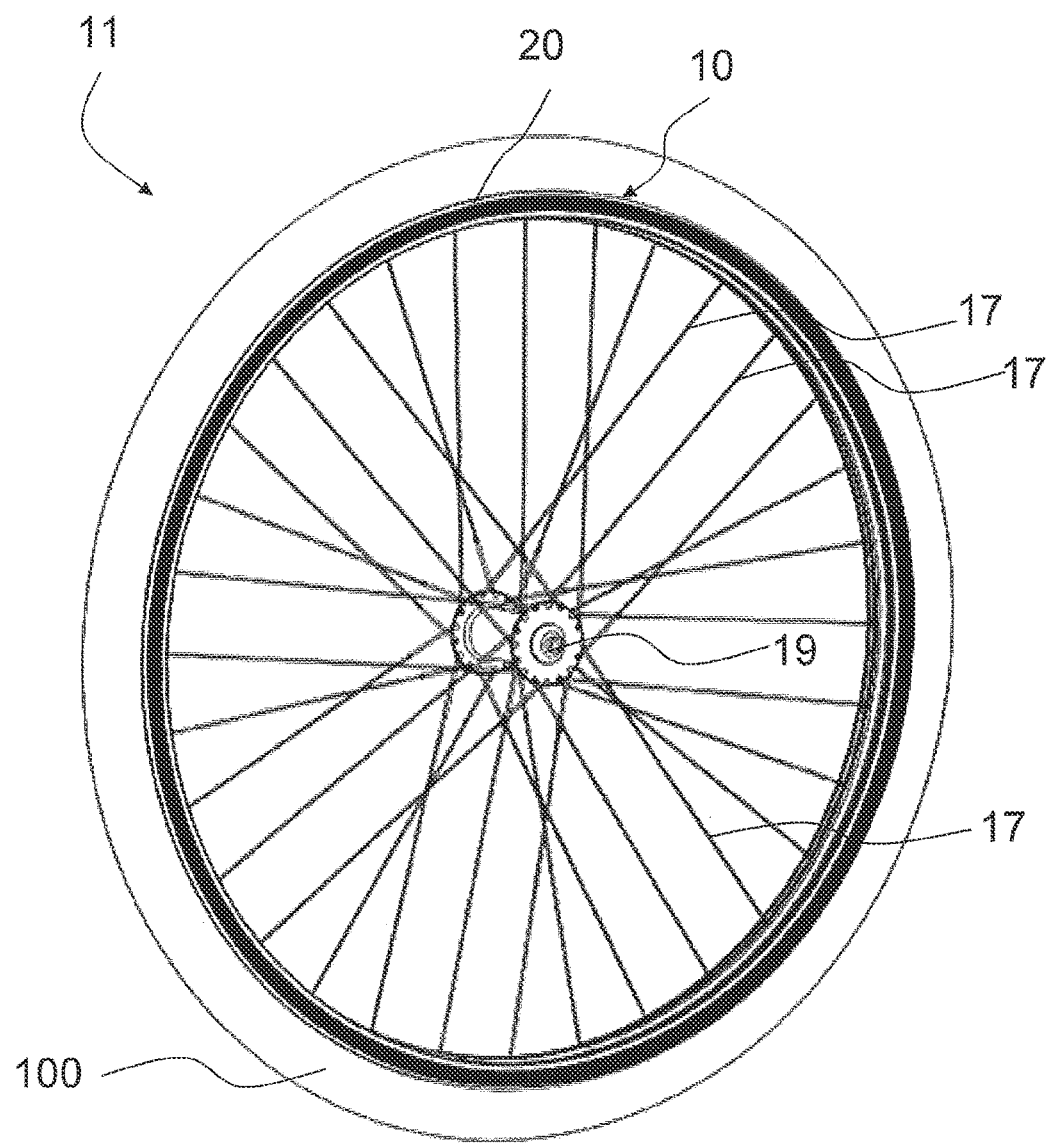

2006/0267397 A1* 11/2006 Possarnig ............... B60B 1/003
　　　　　　　　　　　　　　　　　　　　　　301/95.102
2015/0096672 A1* 4/2015 Tsai ..................... B29C 70/747
　　　　　　　　　　　　　　　　　　　　　　156/242

FOREIGN PATENT DOCUMENTS

| EP | 1018443 A2 | 12/2000 | |
|----|------------|---------|---|
| EP | 2639462 A1 | 9/2013 | |
| FR | 1491485 A | 8/1967 | |
| FR | 3001658 A1 * | 8/2014 | ............. B60B 1/003 |
| GB | 2101541 A * | 1/1983 | ............. B60B 21/08 |

\* cited by examiner

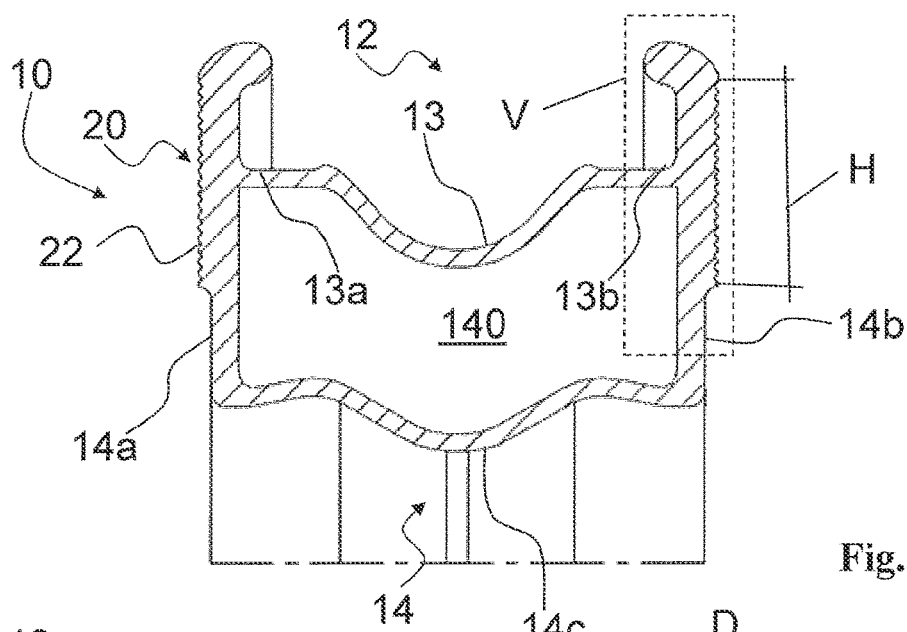
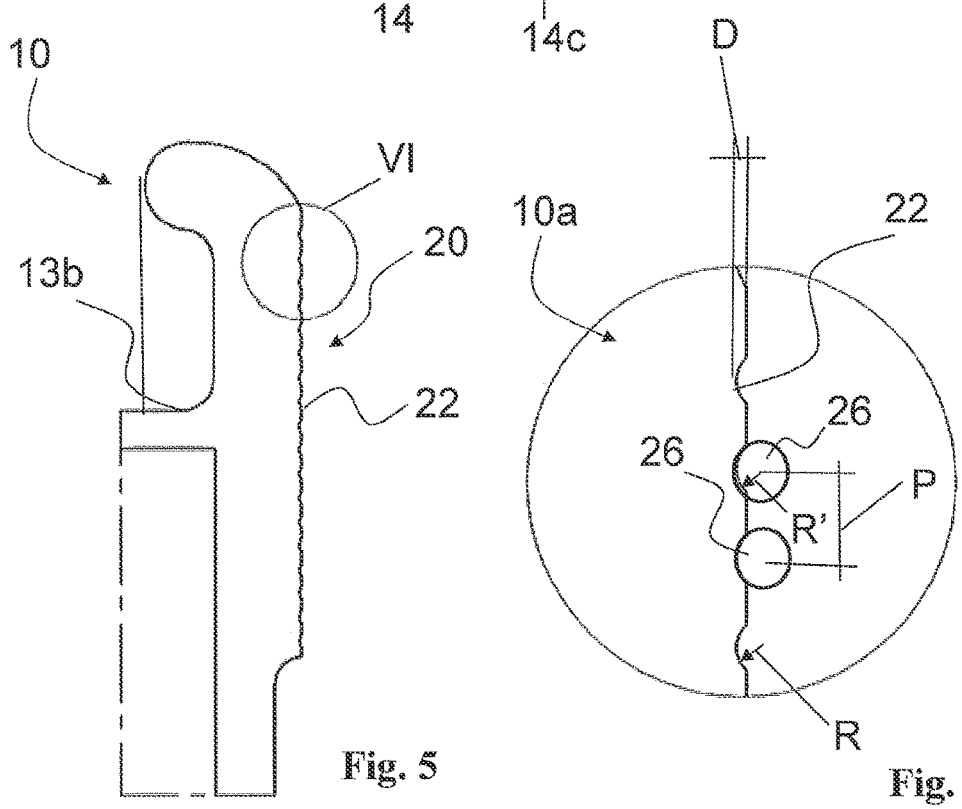

RIM FOR A BICYCLE WHEEL AND RESPECTIVE BICYCLE WHEEL, AS WELL AS METHOD FOR MANUFACTURING SAID RIM

CROSS REFERENCE TO RELATED APPLICATION

This application claims the benefit of Italian Application No. MI2014A000763, which was filed on Apr. 23, 2014, and is incorporated herein by reference as if fully set forth.

FIELD OF INVENTION

The present invention relates to a rim for a bicycle wheel.

The invention also relates to a bicycle wheel comprising such a rim, as well as a method for manufacturing such a rim.

BACKGROUND

As known, a rim for a bicycle wheel comprises an annular body intended to be coupled, on a radially outer side thereof, with a tyre of the bicycle wheel and, on a radially inner side thereof, with a plurality of spokes of the bicycle wheel.

Typically, the aforementioned annular body comprises opposite sidewalls and a bottom wall in which holes are formed for housing the heads of the aforementioned spokes.

On such sidewalls brake tracks are provided, on which the bicycle brake pads act.

In order to provide the rims made from light alloy (typically aluminium or alloys thereof) with a desired hardness, it is known to perform on such rims a surface treatment of plasma electrolytic oxidation (PEO).

However, outdoor tests have shown that the aforementioned treatment penalises the braking, making it discontinuous and/or irregular (in technical jargon, this is known as non-modular braking). In particular, such braking is initially very weak and then too sudden.

In order to make braking more continuous and/or regular, it is known to make suitably oriented grooves on the brake track.

EP 1 018 443 describes a rim comprising, at the brake track, a plurality of concentric circumferential grooves typically made in the extrusion step of the rim.

The Applicant has found that making the aforementioned grooves in the extrusion step requires that an extrusion matric is provided that is specially shaped to make such grooves, with a substantial economic burden and complication of the process. Moreover, after a lot of braking, the aforementioned concentric circumferential groves form corresponding groves on the brake pad and, when they reach a depth equal to the height of the grooves of the brake track, the brake pad no longer offers material to be abraded by the grooves of the brake track, this having a negative impact on the braking efficiency.

On the other hand, making concentric circumferential grooves through subsequent chip-removal mechanical machining would require either the use of a plurality of tools, one for each groove, or the use of a single tool and the consequent need to provide for a discontinuous relative radial movement between rim and tool. Also in this case there would be either an excessive economic burden or excessive complication of the process.

On the market there are also bicycle wheels comprising, at the brake track, a plurality of substantially parallel grooves oriented along a direction inclined by an angle close to 45° with respect to the circumferential or radial direction of the rim. Such rims are subjected to a plasma electrolytic oxidation surface treatment. Also in this case, making the plurality of grooves through subsequent chip-removal mechanical machining requires discontinuous relative circumferential movement between rim and tool, with consequent complication of the process.

Moreover, the Applicant has found that grooves of the type described above cause a lot of noise during braking.

SUMMARY

The technical problem at the basis of the present invention is therefore that of providing a rim for a bicycle wheel that makes it possible to obtain, along with the desired efficiency and regularity of braking, reduced noise during braking itself, keeping the economic burden and/or the complexity of the process as low as possible.

The present invention therefore relates, in a first aspect thereof, to a rim for a bicycle wheel that has an annular body and a side wall of the annual body has a brake track, configured to cooperate with a bicycle brake pad, that includes a helically shaped groove.

Further aspects of the present invention include:
- a helically shaped grove that is defined by a single continuous groove;
- a helically shaped grove that is defined by a plurality of coils that are spaced apart by a predetermined distance in the range between 0.3 mm and 1.5 mm;
- a helically shaped grove that has a surface roughness in the range between 0.5 µm and 1.5 µm;
- a helically shaped grove that has a depth of about 0.02 mm;
- a helically shaped grove that has a section shaped substantially like an arc of circumference, having bending radius (R) in a range between about 0.15 mm and about 0.27 mm;
- a helically shaped grove that extends substantially for an entire radial height (H) of said brake track; and,
- a helically shaped grove in brake track that is made from a light alloy and was subjected to a treatment of plasma electrolytic oxidation.

In particular, the present invention relates to a rim for a bicycle wheel comprising an annular body and, at a sidewall of said annular body, a brake track configured to cooperate with a bicycle brake pad, characterised in that said brake track comprises a helically shaped groove.

Throughout the present description and in the subsequent claims, the expression "helically shaped groove" is used to generically indicate both a groove extending without interruptions along a helical path (in this case the expression "single continuous groove" will be used) and a plurality of grooves (or portions of groove) that follow one another along a helical path spaced and that are spaced apart by surface portions without grooves.

Outdoor tests carried out by the Applicant have shown that with the aforementioned rim for bicycle wheel it is possible to obtain a substantial reduction in noise during braking, when comparing this wheel to wheels having grooves in the brake track that are inclined substantially at 45°with respect to the circumferential or radial direction of the rim and having the same efficiency and regularity of braking.

Moreover, providing a helically shaped groove on the brake track causes a substantial simplification of the manufacturing process, being possible to obtain the groove by a single chip-removal mechanical machining (like for example milling or deep turning) through a single tool that is moved continuously in the radial direction with respect to the rim while it rotates about its own rotation axis.

The rim of the present invention can comprise one or more of the following preferred characteristics, taken individually or in combination.

In the preferred embodiments of the invention, said helically shaped groove is defined by a single continuous groove.

Preferably, the helically shaped groove defines a plurality of coils in the brake track.

More preferably, such coils are spaced apart by a substantially constant distance.

Preferably, said distance is comprised in the range between about 0.3 mm and about 1.5 mm, even more preferably equal to about 0.5 mm.

In accordance with a preferred characteristic of the present invention, the brake track has an average surface roughness comprised in the range between about 0.5 μm and about 1.5 μm, preferably equal to about 1.0 μm.

Throughout the present description and in the subsequent claims, the expression "average surface roughness" is used to refer to the radial roughness Ra, as defined in standard ISO 4287. Advantageously, such average surface roughness values can be advantageously obtained through milling or light turning mechanical machining on the annular body. The aforementioned average surface roughness values must be considered referring to the surface of the brake track without the helically shaped groove, this groove being then formed by a further chip-removal mechanical machining (like for example milling or deep turning).

Preferably, the helically shaped groove has a depth greater than or equal to about 0.02 mm, more preferably greater than or equal to about 0.05 mm.

Preferably, the helically shaped groove has a depth lower than or equal to about 0.07 mm, more preferably lower than or equal to about 0.06 mm.

In accordance with a preferred characteristic of the rim of the present invention, said helically shaped groove has a section shaped substantially like an arc of circumference, having bending radius comprised in the range between about 0.15 mm and about 0.27 mm, preferably equal to about 0.21 mm. Advantageously, such a groove can be advantageously obtained through chip-removal mechanical machining, carried out with a tool provided with a substantially circular head, preferably having a bending radius corresponding to that of the groove to be obtained. The head of the tool could nevertheless also have sharp edges.

Throughout the present description and in the subsequent claims, the expression "substantially circular head" is used to refer to a head having a profile that, for a large part of its extension, has substantially the shape of an arc of circumference.

Preferably, the helically shaped groove extends substantially for the entire radial height of said brake track.

In accordance with a preferred characteristic of the present invention, at least at said brake track said annular body is made from light alloy, preferably aluminium or alloys thereof.

Preferably, said annular body provided with said helically shaped groove is subjected to a plasma electrolytic oxidation surface treatment. Advantageously, such treatment provides the rims with a particularly high hardness, as it is desired. In particular, the plasma electrolytic oxidation surface treatment is carried out on the entire brake track, including the helically shaped groove.

A second aspect of the invention relates to a bicycle wheel having an annular body and a side wall of the annual body has a brake track includes a helically shaped groove and configured to cooperate with a bicycle brake pad.

Advantageously, the bicycle wheel of the invention achieves the technical effects described above in relation to the rim of the invention.

A third aspect of the invention relates to a method for manufacturing a rim of a bicycle wheel by providing an annular body with sidewalls that include a brake track, and forming on at least one sidewall brake track a helically shaped groove is configured to cooperate with a bicycle brake pad.

Further aspects of the manufacturing method include: forming the helically shaped groove through chip-removal mechanical machining; applying a surface treatment of plasma electrolytic oxidation to the annular body; creating an average surface roughness on the annular body in a range between 0.5 μm and 1.5 μm.

In particular, the present invention relates to a method for manufacturing a rim of a bicycle wheel, comprising the following steps:
  providing an annular body;
  forming, on a sidewall of said annular body, a brake track configured to cooperate with a bicycle brake pad;
  characterised in that it comprises the following step:
  making a helically shaped groove on said brake track.

Advantageously, the aforementioned method allows the rim described above to be manufactured.

The method of the present invention can comprise one or more of the following preferred characteristics, taken individually or in combination.

Preferably, said helically shaped groove is made through chip-removal mechanical machining.

More preferably, said chip-removal mechanical machining is carried out with a tool having a substantially circular head, more preferably having a bending radius comprised in the range between about 0.15 mm and about 0.27 mm, even more preferably equal to about 0.21 mm.

In accordance with a preferred characteristic of the present invention, after said step of making said helically shaped groove on the brake track, a surface treatment of plasma electrolytic oxidation of said annular body is carried out.

Preferably, said brake track is made through milling or turning mechanical machining on said annular body to obtain a predetermined average surface roughness, more preferably comprised in the range between about 0.5 μm and about 1.5 μm, even more preferably equal to about 1.0 μm.

BRIEF DESCRIPTION OF THE DRAWING(S)

Figure 2:
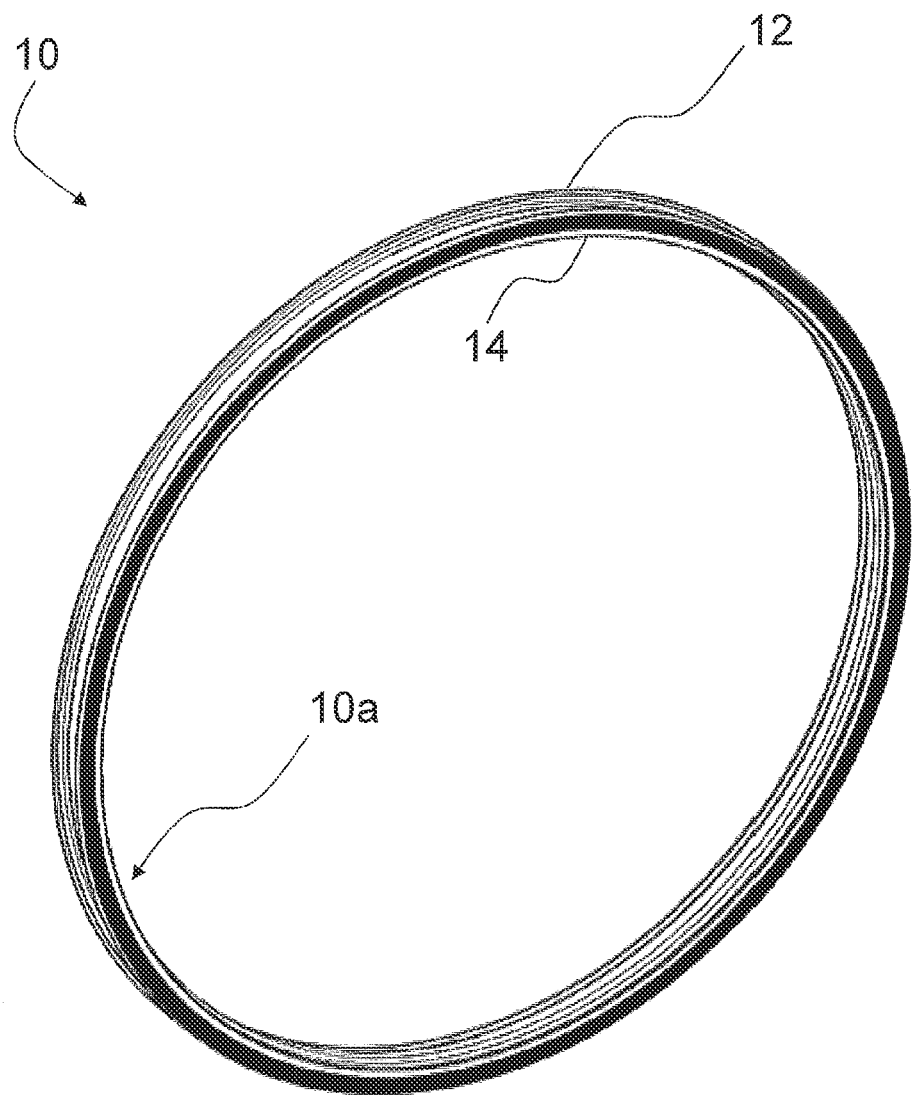
Figure 3:
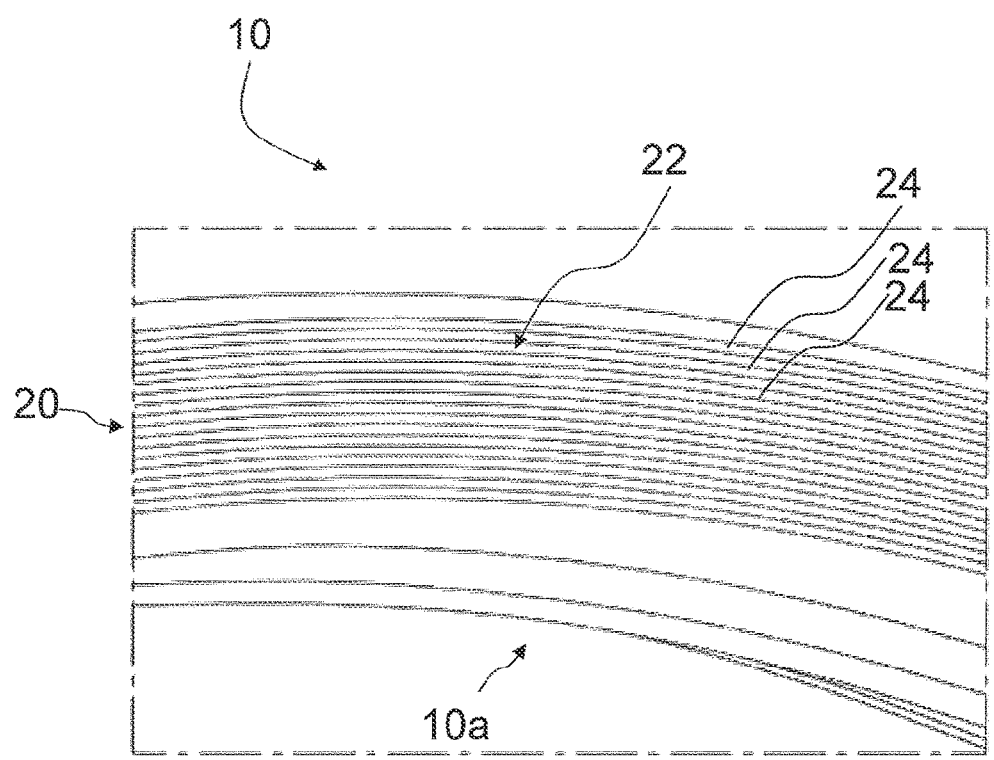

Further characteristics and advantages of the present invention will become clearer from the following detailed description of preferred embodiments thereof, made with reference to the attached drawings, given for indicating and not limiting purposes. In such drawings:

FIG. 1 schematically shows a perspective view of a bicycle wheel according to the present invention;

FIG. 2 schematically shows a perspective view of the rim of the bicycle wheel of FIG. 1;

FIG. 3 schematically shows a perspective view, in enlarged scale, of a portion of the rim of FIG. 2;

FIG. 4 schematically shows a radial section view, in enlarged scale, of the rim of FIG. 2;

FIG. 5 schematically shows an enlarged view of a portion of the radial section of FIG. 4, said portion being drawn inside a dashed rectangle indicated with V;

FIG. 6 schematically shows an enlarged view of a portion the radial section of FIG. 5, said portion being drawn inside a circumference indicated with VI.

DETAILED DESCRIPTION OF THE PREFERRED EMBODIMENT(S)

The figures show a rim of a bicycle wheel in accordance with the present invention. Such a rim is indicated with 10, whereas the wheel is indicated with 11.

The rim 10 comprises an annular body 10a configured to be coupled, at a radially outer portion 12 thereof, with a tyre 100 and, at a radially inner portion 14 thereof, with a plurality of spokes 17. For this purpose, a plurality of attachment holes for the heads of the spokes 17 are formed on the radially inner portion 14 of the annular body 10a.

The spokes 17 are connected to a hub 19 (FIG. 1) at the opposite ends to the ends for attachment to the rim 10.

The radially outer portion 12 is separated from the radially inner portion 14 by a separating wall 13 (FIG. 4) that comprises, at the opposite axial end portions thereof, surfaces 13a, 13b providing for supporting the beads of the tyre 100.

The radially inner portion 14 comprises opposite sidewalls 14a, 14b and a bottom wall 14c on which the holes for the attachment of the spokes 17 are formed. Such walls 14a, 14b and 14c, together with the separating wall 13, defined a single closed chamber 140 in the radially inner portion 14 of the rim 10 (FIG. 4).

On each of the aforementioned sidewalls 14a, 14b, or on at least one of the aforementioned sidewalls 14a, 14b, a brake track 20 is formed, which is configured to cooperate with a bicycle brake pad (not shown).

Preferably, the rim 10 is made, at least at the brake track 20, from a metallic material, preferably a light alloy, for example aluminium or alloys thereof. The remaining part of the rim 10 can even be made from a composite material comprising structural fibres incorporated in a polymeric matrix.

In accordance with the present invention, the brake track 20 comprises a helically shaped groove 22 (FIGS. 3 and 5). In the specific example illustrated here, this is a single continuous groove, but what is stated herein has analogous application in the case in which the groove 22 is defined by a plurality of portions of groove.

Such a groove 22 defines, in the brake track 20, a plurality of coils 24 (FIG. 3) which are spaced apart by a distance P (FIG. 6). Preferably, such a distance P is constant, i.e. the coils are equally spaced apart from each other along any radial direction.

The distance P is preferably comprised in the range between about 0.3 mm and about 1.5 mm. More preferably, the distance P is equal to about 0.5 mm.

The brake track 20 preferably has an average surface roughness comprised in the range between about 0.5 μm and about 1.5 μm. More preferably, the average surface roughness is equal to about 1.0 μm. Such values of average surface roughness are obtained upon light milling or turning mechanical machining on the annular body 10a.

The groove 22 preferably has a depth D (FIG. 6) comprised in the range between about 0.02 mm and about 0.07 mm. More preferably, the depth D is comprised in the range between about 0.05 mm and about 0.06, the extremes being included.

With particular reference to FIG. 6, the groove 22 preferably has a section shaped substantially liked an arc of circumference. Such a section preferably has a bending radius R comprised in the range between about 0.15 mm and about 0.27 mm. More preferably, the bending radius R is equal to about 0.21 mm. Such a groove 22 is obtained by carrying out a chip-removal mechanical machining through a tool 26 with a substantially circular head, preferably having a bending radius R' corresponding to that of the groove 22 to be obtained (in FIG. 6 the tool 26 is shown in two successive machining positions).

Preferably, the groove 22 extends substantially for the entire radial height H (FIG. 4) of the brake track 20.

The annular body 10a provided with the groove 22 is preferably subjected to a plasma electrolytic oxidation surface treatment.

The method for manufacturing the rim 10 of the present invention comprises, once the annular body 10a has been made, making the brake track 20 on a sidewall 14a or 14b of the annular body 10a.

Preferably, the brake track 20 is made through light milling or turning mechanical machining. This is made in order to obtain the average surface roughness discussed above.

Preliminarily, the annular body 10a can be subjected to a shot blasting operation.

Thereafter, the helically shaped groove 22 is formed on the brake track 20, through chip-removal mechanical machining (like for example milling or deep turning).

This mechanical process is carried out through the tool 26 described above. Such a tool 26 therefore has a bending radius R' comprised in the range between about 0.15 mm and about 0.27 mm. More preferably, the tool 26 has a bending radius R' equal to about 0.21 mm.

Before or after forming the groove 22 on the annular body 10a the coupling holes for the spokes 17 are formed.

The annular body 10a is finally subjected to a plasma electrolytic oxidation surface treatment, after a washing.

Of course, a man skilled in the art can bring numerous modifications and variants to the rim of a bicycle wheel and to the respective bicycle wheel—as well as to the method for manufacturing the rim—described above, in order to satisfy specific and contingent requirements, all of which being in any case within the scope of protection of the present invention as defined by the following claims.

What is claimed is:

1. Rim for a bicycle wheel comprising an annular body having sidewalls, at least one sidewall has a brake track that is configured to cooperate with a bicycle brake pad and includes a single continuous helically shaped groove.

2. Rim according to claim 1, wherein said single continuous helically shaped groove defines a plurality of coils that are spaced apart by a substantially constant distance.

3. Rim according to claim 2, wherein said distance (P) is in a range between about 0.3 mm and about 1.5 mm.

4. Rim according to claim 2, wherein said distance (P) is equal to about 0.5 mm.

5. Rim according to claim 1, wherein said brake track has an average surface roughness in a range between about 0.5 μm and about 1.5 μm.

6. Rim according to claim 1, wherein said single continuous helically shaped groove has a depth greater than or equal to about 0.02 mm.

7. Rim according to claim 1, wherein said single continuous helically shaped groove has a section shaped substantially like an arc of circumference, having bending radius (R) in a range between about 0.15 mm and about 0.27 mm.

8. Rim according to claim 1, wherein said single continuous helically shaped groove extends substantially for an entire radial height (H) of said brake track.

9. Rim according to claim 1, wherein said annular body is made from light alloy at least at said brake track.

10. Rim according to claim 9, wherein said annular body provided with said single continuous helically shaped groove was treated with plasma electrolytic oxidation.

11. Bicycle wheel comprising a rim according to claim 1.

12. Method for manufacturing a rim for a bicycle wheel, comprising the following steps:
    providing an annular body with sidewalls; and
    forming on at least one of said sidewalls a single continuous helically shaped groove in a brake track that is configured to cooperate with a bicycle brake pad.

13. Method according to claim 12, wherein said single continuous helically shaped groove is formed through chip-removal mechanical machining.

14. Method according to claim 12, further comprising the further step of applying a surface treatment of plasma electrolytic oxidation to said annular body.

15. Method according to any one of claim 12, wherein said brake track is formed through mechanical milling or turning machining on said annular body and has an average surface roughness in a range between about 0.5 μm and about 1.5μm.

16. Rim for a bicycle wheel comprising an annular body with sidewalls having brake tracks configured to cooperate with a bicycle brake pad, wherein at least one of said brake tracks includes a single continuous helically shaped groove.

\* \* \* \* \*

UNITED STATES PATENT AND TRADEMARK OFFICE
CERTIFICATE OF CORRECTION

PATENT NO.         : 9,579,928 B2
APPLICATION NO.    : 14/692268
DATED              : February 28, 2017
INVENTOR(S)        : Amleto Granieri et al.

Page 1 of 1

It is certified that error appears in the above-identified patent and that said Letters Patent is hereby corrected as shown below:

On the Title Page

In Item (72), under "Inventors", in Column 1, Line 2, delete "Dueville" and insert -- Dueville (VI) --, therefor.

In the Specification

In Column 1, Line 48, delete "matric" and insert -- matrix --, therefor.
In Column 1, Line 51, delete "groves" and insert -- grooves --, therefor.
In Column 1, Line 52, delete "groves" and insert -- grooves --, therefor.
In Column 1, Line 62, delete "case" and insert -- case, --, therefor.
In Column 2, Line 25, delete "grove" and insert -- groove --, therefor.
In Column 2, Line 27, delete "grove" and insert -- groove --, therefor.
In Column 2, Line 30, delete "grove" and insert -- groove --, therefor.
In Column 2, Line 32, delete "grove" and insert -- groove --, therefor.
In Column 2, Line 34, delete "grove" and insert -- groove --, therefor.
In Column 2, Line 38, delete "grove" and insert -- groove --, therefor.
In Column 2, Line 40, delete "grove" and insert -- groove --, therefor.
In Column 2, Line 54, delete "spaced and that" and insert -- that --, therefor.
In Column 2, Line 61, delete "45°with" and insert -- 45° with --, therefor.
In Column 4, Line 3, delete "track" and insert -- track that --, therefor.
In Column 5, Line 27, delete "defined" and insert -- define --, therefor.
In Column 5, Line 36, delete "example" and insert -- example, --, therefor.
In Column 5, Line 63, delete "0.06," and insert -- 0.06 mm, --, therefor.

In the Claims

In Column 7, Line 19, in Claim 15, delete "any one of claim" and insert -- claim --, therefor.

Signed and Sealed this
Ninth Day of May, 2017

Michelle K. Lee
*Director of the United States Patent and Trademark Office*